UNITED STATES PATENT OFFICE.

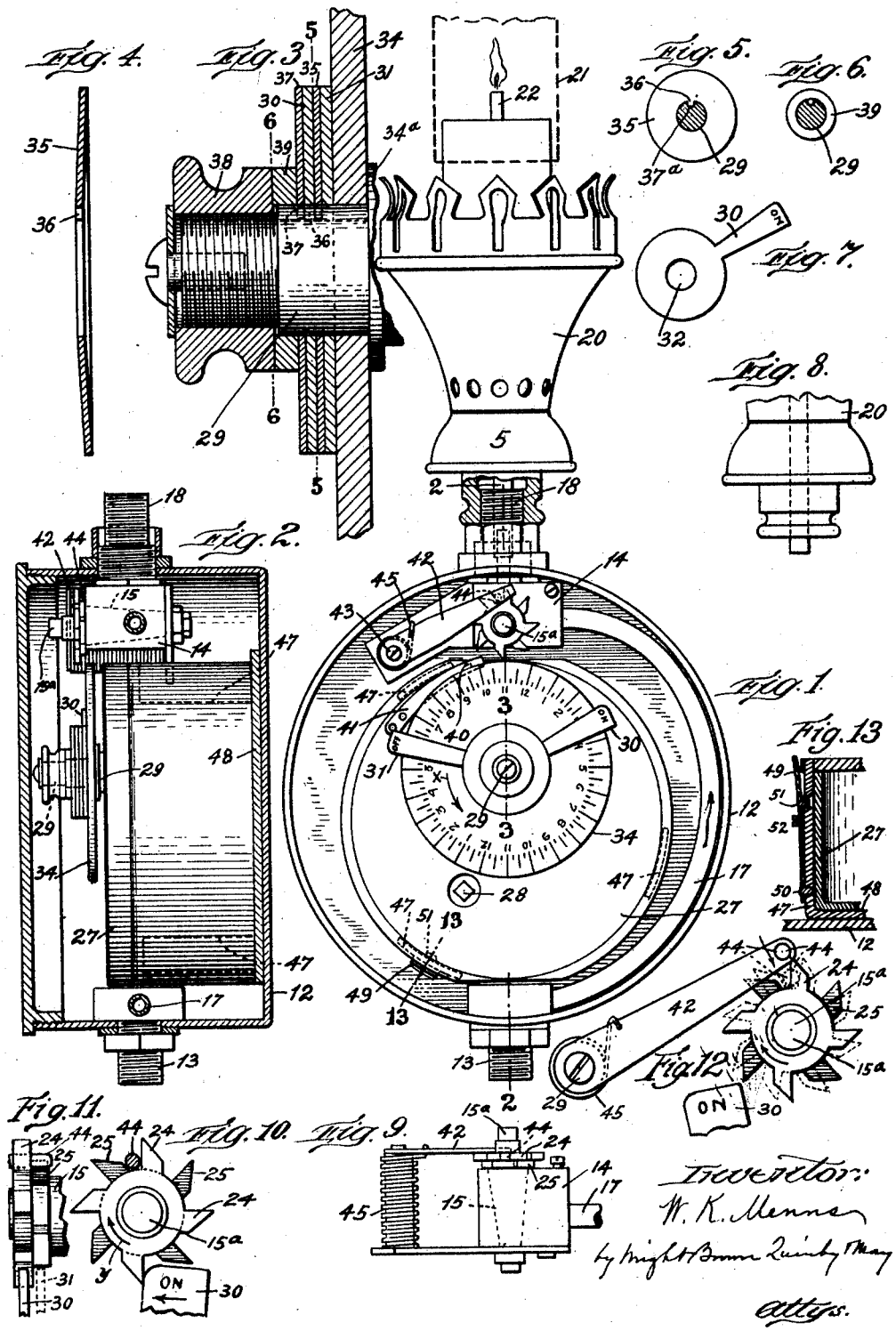
W. K. MENNS.
TIME CONTROLLING MECHANISM.
APPLICATION FILED SEPT. 13, 1919.
1,360,308.
Patented Nov. 30, 1920.

WALTER K. MENNS, OF CHELSEA, MASSACHUSETTS, ASSIGNOR TO BOSTON CLOCK COMPANY, OF BOSTON, MASSACHUSETTS, A CORPORATION OF MASSACHUSETTS.

TIME-CONTROLLING MECHANISM.

1,360,308.    Specification of Letters Patent.    Patented Nov. 30, 1920.

Application filed September 13, 1919. Serial No. 323,639.

*To all whom it may concern:*

Be it known that I, WALTER K. MENNS, a subject of the King of Great Britain, residing at Chelsea, in the county of Suffolk and State of Massachusetts, have invented new and useful Improvements in Time-Controlling Mechanism, of which the following is a specification.

This invention has for its chief object to provide improved apparatus for automatically controlling the supply of illuminating gas to street lamps by opening and closing the cocks of such lamps, to turn on the gas in the evening and shut it off at daylight, although the invention may be embodied in automatic periodically-operated controlling mechanism for other purposes.

The invention is characterized broadly by a unidirectionally rotatable controlling member, which may be the plug of a gas cock, a time piece, and connections between said controlling member and a continuously rotating shaft of the time piece, whereby the controlling member is intermittently and unidirectionally rotated.

The invention is also characterized by the improved organization of the said connections, and by other features, all as hereinafter described and claimed.

Of the accompanying drawings forming a part of this specification,—

Figure 1 is a front elevation of a gas burner supply controlling apparatus embodying the invention.

Fig. 2 is a section on line 2—2 of Fig. 1.

Fig. 3 is an enlarged section on line 3—3 of Fig. 1.

Fig. 4 is a sectional view of one of the washers.

Fig. 5 is a section on line 5—5 of Fig. 3.

Fig. 6 is a section on line 6—6 of Fig. 3.

Fig. 7 is a side view of one of the actuating arms hereinafter referred to.

Fig. 8 is a side view of a portion of the burner.

Fig. 9 is a bottom plan view of the gas cock shown by Figs. 1 and 2.

Fig. 10 is a view showing one end of the controlling member and a portion of one of the actuating arms hereinafter described.

Fig. 11 is a view showing a portion of one side of the controlling member and the two actuating arms, one being shown by dotted lines.

Fig. 12 is a view similar to Fig. 10 illustrating the action of the spring-pressed dog which additionally rotates the controlling member.

Fig. 13 is a section on line 13—13 of Fig. 1.

The same reference characters indicate the same parts in all of the figures.

Referring to the preferred embodiment of the invention shown by the drawings, 12 represents a housing provided with a nipple 13 at its lower portion, adapted to be engaged with a gas pipe in a lamp post, said nipple forming a part of a gas conduit. To the upper portion of the housing is fixed the casing 14 of a gas cock, the plug 15 of which is adapted to be unidirectionally rotated, and is so constructed that an intermittent rotation alternately opens and closes the cock. Gas is conducted from the nipple 13 to the cock casing 14 by a curved tube 17 within the housing. The upper portion of the housing is provided with a nipple 18 on which is screwed the base of a gas burner, indicated as a whole by the reference numeral 20, the burner being of any type suitable for street lighting. A Welsbach mantle is conventionally shown at 21, and a pilot burner at 22. Any suitable conduit means may be provided for conducting gas from the cock casing to the main burner, and to the pilot burner.

The cock plug 15 has a reduced extension 15ª projecting from the casing 14, and to this extension is fixed a hub or collar having two series of radial teeth, the teeth of one series being designated 24, and those of the other series 25. Each series of teeth is coaxial with the plug 15, and the two series are in different planes, as best shown by Fig. 11, the teeth of one series being in staggered relation to the teeth of the other series.

27 represents the case of a time piece or clock secured within the casing. Of the mechanism of the clock I show only the winding post 28 and a continuously rotated shaft 29, this shaft projecting from the case and being rotated preferably once in twenty-four hours.

To the shaft 29 are fixed two tooth-engaging arms 30 and 31, which radiate from the shaft and are revolved by the rotation thereof. Said arms are arranged in parallel planes, the plane of the arm 30 coinciding with the plane of the teeth 24, while the plane of the arm 31 coincides with the plane of the teeth 25. The arrangement is such that when the arms are revolved from the positions shown by Fig. 1, by the rotation of the shaft 29, said shaft rotating counter clockwise, as shown by the arrow $x$, the arm 30 strikes one of the teeth 24 and partly turns the plug cock in the direction of the arrow $y$. The form of the outer end of the arm is such that before leaving the engaged tooth, it turns the plug enough to open the cock, which remains open until the arm 31 strikes one of the teeth 25, and partly turns the plug cock in the same direction enough to close the cock.

The arms 30 and 31 are adjustably secured to the shaft 29, so that their angular positions may be varied to time their coaction with the teeth 24 and 25. Each arm has an enlarged portion or hub at its inner end, as shown by Fig. 7, and an orifice 32 in said portion through which the shaft 29 passes loosely. Surrounding the shaft is a graduated indicating plate or disk 34, against which the arm 31 bears, the central portion of said disk bearing on a shoulder 34$^a$ on the shaft. A washer 35 having a tongue 36 engaged with a groove 37 in the shaft 29 bears on the arm 31. One side of the arm 30 bears on the washer 35, and a similar washer 37 bears on the other side of the arm 30. A clamping nut 38 engaged with a threaded outlet end portion of the shaft 29 acts through a smaller washer 39 on the layers formed by the washers 37 and 35, and arms 30 and 31, to clamp the arm 31 against the disk 34 and the arm 30 between the washers 35 and 37. It will be seen, therefore, that the arms may be firmly secured in various angular positions. The graduations shown by Fig. 1, on the disk 34, guide the operator in setting the arms 30 and 31 to time their coaction with the plug teeth. The disk 34 may be rotatively adjusted on the shaft 29, and its graduations may coöperate with a fixed mark 40 on a member 41 fixed to the case 27.

It will now be seen that I have provided clamping means common to both arms, carried by the shaft, and adapted to operatively secure the arms to the shaft in any angular positions to which they may be adjusted, a single manipulation, such as the loosening of the clamping nut 38, permitting the adjustment of the arms, and a single manipulation, such as the tightening of said nut, securing the arms simultaneously in their adjusted positions.

The disk or plate 34 constitutes an element of said clamping means, and is of greater diameter than the arm hubs, so that its graduated portion is exposed for coöperation with the arms in determining the positions to which they should be adjusted to time the intermittency of the rotation of the plug.

To impart a quick additional forward rotation to the controlling member or plug 15, after each of the arms 30 and 31 leaves the tooth engaged thereby, I provide a dog or lever 42 pivoted at 43 and having a pin 44 normally held by a spring 45 in the position shown by Fig. 10. The teeth 24 and 25 have beveled end faces arranged to raise or displace the pin 44 as shown by full lines in Fig. 12, the arrangement being such that when either of the arms 30 or 31 leaves the tooth engaged and moved by it, the pin 44 is displaced and is free to coact with the longer radial side of another tooth, so that when the pin is returned to its normal position by the spring 45, the controlling member 15 is moved from the position shown by full lines to that shown by dotted lines, in Fig. 12. The controlling member is therefore moved at a quick rate to its predetermined operative position. The case 27 is positioned in the housing 12 by arms or brackets 47 projecting from a plate 48 fixed to the back of the housing, the casing being adapted to be inserted in and removed from the space partially surrounded by said brackets. One of the brackets 47 is provided with a latch or detent composed of a resilient arm 49, Fig. 13, riveted at 50 to the bracket and a pin 51 fixed to said arm and projecting through a hole in the bracket into a depression 52 in the case 27. The outer end of the arm 49 is formed to be displaced by a finger of the operator to withdraw the pin 51 from the depression 52 and permit the removal of the case from the housing.

It will be seen that the teeth 24 and 25, and the revolving arms 30 and 31, constitute a simple, compact, and effective means for imparting unidirectional rotation to the controlling member, and turning the same to one or the other of two predetermined positions, there being no shocks or jars such as are involved when weighted arms or levers are employed.

The rotary part or controlling member having the teeth 24 and 25, may be adapted to perform a different function, and may be, for example, an element of an electric switch or a thermostat, or of a so called water clock for turning on and shutting off water.

As implied in the foregoing description and in the following claims, I am not limited to the specific mechanism of the preferred embodiment of my improvements shown by the drawings, except as otherwise required in certain of the more limited claims.

I claim:

1. An automatic periodically-operated controlling mechanism comprising a unidirectionally rotatable controlling member, a time piece, connections between said controlling member and a continuously rotating shaft of the time piece, adapted to intermittently impart a relatively slow partial rotation to the said member in one direction, and means operable by said connections to intermittently impart a faster partial rotation to said member in the same direction.

2. An automatic periodically - operated controlling mechanism comprising a unidirectionally rotatable controlling member, two series of radial teeth fixed to and coaxial with said member and arranged in parallel planes, the teeth of one series being in staggered relation to those of the other series, a time piece, and a pair of tooth-engaging arms fixed to and radiating from a continuously rotating shaft of the time piece, and arranged in parallel planes, the plane of one arm being in the plane of one series of teeth, and the plane of the other arm in the plane of the other series, the arrangement being such that the controlling member is turned unidirectionally and intermittently by the coaction of the arms and teeth to render said member alternately operative and inoperative.

3. An automatic periodically-operated controlling mechanism comprising a unidirectionally rotatable controlling member, two series of radial teeth fixed to and coaxial with said member and arranged in parallel planes, the teeth of one series being in staggered relation to those of the other series, a time piece, including a continuously rotating shaft, a pair of tooth-engaging arms having hubs located side by side on said shaft, so that the hubs and arms are arranged in parallel planes, the plane of one arm being in the plane of one series of teeth, and the plane of the other arm being in the plane of the other series, said arms being adapted to be turned independently on the shaft to vary their angular positions and time their coaction with said teeth, and clamping means common to both arms, carried by the shaft and operable by a single manipulation to release the arms, and by another single manipulation to operatively secure the arms to the shaft in any positions to which they may be adjusted.

4. An automatic periodically - operated controlling mechanism comprising a unidirectionally rotatable controlling member, two series of radial teeth fixed to and coaxial with said member and arranged in parallel planes, the teeth of one series being in staggered relation to those of the other series, a time piece, including a continuously rotating shaft, a pair of tooth-engaging arms having hubs located side by side on said shaft, so that the hubs and arms are arranged in parallel planes, the plane of one arm being in the plane of one series of teeth, and the plane of the other arm being in the plane of the other series, said arms being adapted to be turned independently on the shaft to vary their angular positions and time their coaction with said teeth, and clamping means common to both arms, carried by the shaft and operable by a single manipulation to release the arms, and by another single manipulation to operatively secure the arms to the shaft in any positions to which they may be adjusted, said clamping means including a graduated indicator plate seated on a shoulder on the shaft and bearing on one of said arms, and a clamping nut having a screw-thread engagement with the shaft, said graduated plate being of greater diameter than the arm hubs, and adapted to guide the operator in adjusting the arms to time their coaction with the teeth.

5. An automatic periodically - operated controlling mechanism comprising a unidirectionally rotatable controlling member, two series of radial teeth fixed to and coaxial with said member and arranged in parallel planes, the teeth of one series being in staggered relation to those of the other series, a time piece, including a continuously rotating shaft, a pair of tooth-engaging arms having hubs located side by side on said shaft, so that the hubs and arms are arranged in parallel planes, the plane of one arm being in the plane of one series of teeth, and the plane of the other arm being in the plane of the other series, said arms being adapted to be turned independently on the shaft to vary their angular positions and time their coaction with said teeth, the shaft being provided with a threaded outer end portion, a longitudinal groove, and a shoulder, a plate seated on said shoulder, and rotatable with the shaft, said plate forming a seat for one of said arms, a clamping nut engaged with said threaded end portion, and washers alternating with the arm hubs, and having tongues entering said groove, said plate, washers, and clamping nut constituting elements of clamping means common to both arms, whereby the arms may be operatively secured to the shaft in any positions to which they may be adjusted.

6. An automatic periodically - operated controlling mechanism comprising a unidirectionally rotatable controlling member, a time piece, two series of radial teeth fixed to and coaxial with said member and arranged in parallel planes, the teeth of one series being in staggered relation to those of the other series, arms fixed to and radiating from a continuously rotating shaft of the time piece and arranged in parallel planes, said teeth and arms constituting connections between said controlling member and shaft, adapted to intermittently turn said member at a relatively slow rate in one direction, and spring-pressed means coöp- erating with said teeth to additionally turn said member at a more rapid rate to predetermined operative positions.

7. An automatic periodically-operated controlling mechanism comprising a unidirectionally rotatable controlling member, a time piece, two series of radial teeth fixed to and coaxial with said member and arranged in parallel planes, each tooth having a beveled end face and a radial side face, the teeth of one series being in staggered relation to those of the other series, arms fixed to and radiating from a continuously rotating shaft of the time piece and arranged in parallel planes, said teeth and arms constituting connections between said controlling member and shaft adapted to intermittently turn said member at a relatively slow rate in one direction, a spring pressed lever pivoted to a fixed support and having a pin which is displaceable by the beveled face of either tooth, and is adapted to coact with the radial face of the tooth in additionally turning said member in the same direction at a more rapid rate, to a predetermined operative position.

8. A supply-controlling mechanism for gas burners, comprising a gas cock having a unidirectionally rotatable plug, two series of radial teeth fixed to and coaxial with said plug and arranged in parallel planes, the teeth of one series being in staggered relation to those of the other, a time piece and a pair of tooth-engaging arms fixed to and radiating from a continuously rotating shaft of the time piece, and arranged in parallel planes coincident with the planes of the series of teeth, the plug being unidirectionally turned at predetermined periods by the coaction of said arms and plug teeth, to alternately open and close the cock.

9. A supply-controlling mechanism for gas burners, comprising a gas cock having a unidirectionally rotatable plug, two series of teeth fixed to and coaxial with said plug and arranged in parallel planes, each tooth having a beveled end face and a radial side face, the teeth of one series being in staggered relation to those of the other, a housing, a time piece fixed in said housing, a pair of tooth-engaging arms fixed to and radiating from a continuously rotating shaft of the time piece, and arranged in parallel planes coincident with the planes of the series of teeth, the plug being turned in one direction at predetermined periods and at a relatively slow rate by the coaction of said arms and plug teeth, and a spring-pressed lever pivoted to the housing and having a pin which is displaceable by the beveled face of either tooth and is adapted to coact with the radial face of the tooth in additionally turning the plug in the same direction, at a more rapid rate, to a predetermined operative position.

In testimony whereof I have affixed my signature.

WALTER K. MENNS.